United States Patent
Takeno et al.

(10) Patent No.: US 6,851,768 B2
(45) Date of Patent: Feb. 8, 2005

(54) STRUCTURE FOR STANDARDIZING PARTS OF A ROLLER ASSEMBLY FOR A CONSTRUCTION VEHICLE

(75) Inventors: Hiroyuki Takeno, Hiratsuka (JP); Isao Yoshida, Chigasaki (JP); Makoto Takagi, Fujisawa (JP); Go Morishima, Chigasaki (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/354,108

(22) Filed: Jan. 30, 2003

(65) Prior Publication Data

US 2003/0151304 A1 Aug. 14, 2003

(30) Foreign Application Priority Data

| Feb. 1, 2002 | (JP) | ........................................ | 2002-025757 |
| Jul. 29, 2002 | (JP) | ........................................ | 2002-219151 |
| Dec. 2, 2002 | (JP) | ........................................ | 2002-349446 |
| Jan. 7, 2003 | (JP) | ........................................ | 2003-001027 |

(51) Int. Cl.$^7$ .................... B60B 17/00; B62D 55/14; B12H 1/04
(52) U.S. Cl. .................. 305/136; 305/138; 29/894.012
(58) Field of Search .................. 305/124, 126, 305/129–130, 136–138, 52; 29/895, 894.01, 894.011, 894.012

(56) References Cited

U.S. PATENT DOCUMENTS

| 1,602,530 A | | 10/1926 | White | | |
| 4,695,102 A | * | 9/1987 | Crotti | .......................... | 305/100 |
| 6,280,009 B1 | * | 8/2001 | Oertley | ........................ | 305/136 |
| 6,457,786 B1 | * | 10/2002 | Maguire | ...................... | 305/136 |
| 6,474,754 B1 | * | 11/2002 | Hasselbusch | ............... | 305/136 |
| 6,742,853 B2 | * | 6/2004 | Takeno et al. | .............. | 305/201 |

FOREIGN PATENT DOCUMENTS

| DE | 1 277 222 | | 6/1972 | | |
| EP | 1312539 A1 | * | 5/2003 | .................. | 305/198 |
| EP | 1332952 A2 | * | 8/2003 | .................. | 305/136 |
| FR | 1 360 551 | | 5/1964 | | |
| JP | 2000-159159 | | 6/2000 | | |

OTHER PUBLICATIONS

US 2003/0090151 A1, Takeno et al, May 15, 2003, all pages.*

Search Report, dated Apr. 27, 2004, from the European Patent Office for Paten Application No. 03250569.5–2425.

* cited by examiner

Primary Examiner—S. Joseph Morano
Assistant Examiner—Jason R Bellinger
(74) Attorney, Agent, or Firm—Pillsbury Winthrop LLP

(57) ABSTRACT

A structure for standardizing at least one kind of part of a roller assembly for a construction vehicle so that the part can be used for a same size of construction vehicles having different structural specifications of a plurality of construction vehicle makers. The at least one kind of part includes at least one of a shell, a shaft, a floating seal, a bushing and a collar. Structural specifications including the configuration and dimension, the kind of steel or material, and the heat treatment specification or the mechanical property for the at least one kind of part are unified as much as possible over the same size of the construction vehicles of a plurality of construction vehicle makers.

11 Claims, 3 Drawing Sheets

STRUCTURE FOR STANDARDIZING PARTS OF A ROLLER ASSEMBLY FOR A CONSTRUCTION VEHICLE

This application is based on and claims priority from JP 2002-025757 filed on Feb. 1, 2002, JP 2002-219151 filed on Jul. 29, 2002, JP 2002-349446 filed on Dec. 2, 2002 and JP 2003-001027 filed on Jan. 7, 2003, the contents of which are incorporated herein by reference.

BACKGROUND OF THE INVENTION

1. Field of the Invention

The present invention relates to a structure for standardizing parts of a roller assembly for a construction vehicle, which can be used for the same size of construction vehicles having different structural specifications of a plurality of construction vehicle makers.

2. Description of Related Art

As disclosed in Japanese Patent Publication 2000-159159 and as illustrated in FIGS. 5 and 6, a roller assembly for a construction vehicle mounted to an endless track generally includes a shell 1, a shaft 2, a floating seal 3, a bushing 4 and a collar 5 as parts.

The shell 1 is a part which directly contacts a link of the endless track. The shell 1 is manufactured by forging or casting material, rough-machining the material, welding or pressure-welding the materials, heat-treating the material, and finish-machining the material into a final part.

The shaft 2 is an axis part about which the shell 1 rotates. The shaft 2 is manufactured by cutting a rolled bar having a circular cross section, rough-machining the bar, forming a hole in the bar by drilling, heat-treating the bar, and finish-machining the bar into a final part.

The roller assembly is lubricated by oil so that the shell 1 can smoothly rotate about the shaft 2. The floating seal 3 is a part for preventing lubricating oil from leaking much outside at a contacting surface between the shaft 2 and the shell 1 during relative rotation.

The bushing 4 is a part acting as a bearing metal.

The collar 5 is a part for fixing the roller assembly to a track frame. The collar 5 is manufactured usually by forging or casting a material, and finish-machining the material into a final part. The collar 5 may be manufactured by machining a rolled rod.

The structural specification for each part of the roller assembly is different among the construction vehicles manufactured by different construction vehicle makers, even if the size of the construction vehicles is the same among five sizes of construction vehicles, including a super-large size, a large size, a middle size, a small size, and a super-small size.

When the size of the construction vehicle changes, the configuration and the dimension of each part of the roller assembly also change according to the change in size of the construction vehicle.

When the endless track maker manufactures roller assemblies for the same size of construction vehicles of different construction vehicle makers, the roller maker has to manufacture shells, shafts, floating seals, bushings and collars that can be used only for the corresponding construction vehicles of each construction vehicle maker. Since the configurations and dimensions of the roller assemblies change according to a change in size of the construction vehicle, for each roller part (the shell 1, the shaft 2, the floating seal 3, the bushing 4, and the collar 5) the roller maker has to manufacture a large number (the number of the construction vehicle makers×the number (five) of the sizes of the construction vehicles) of kinds of parts. As a result, the number of the kinds of the parts is very large, and a reduction in cost due to mass production has been difficult to achieve.

SUMMARY OF THE INVENTION

An object of the present invention is to provide a structure for standardizing at least one part of a roller assembly so that parts having the same structure can be commonly used for the same size of construction vehicles having different structural specifications of a plurality of construction vehicle makers.

According to the present invention, the above object can be performed by a structure for standardizing at least one part of a roller assembly for a construction vehicle so that parts can be used for the same size of construction vehicles having different structural specifications of a plurality of construction vehicle makers. The at least one part includes at least one of a shell, a shaft, a floating seal, a bushing and a collar.

When the at least one part of the roller assembly includes at least one of the shell, the shaft, the floating seal and the bushing, except for the dimension of the shaft in the axial direction of the roller assembly, each of the configurations and dimensions in a radial direction and in the axial direction of the roller assembly, the kind of steel or material, and the heat treatment specification or mechanical property of the at least one the shell, the shaft, the floating seal and the bushing is unified over the same size of construction vehicles having different structural specifications of the plurality of construction vehicle makers. The dimension of the shaft in the axial direction of the roller assembly is varied according to the construction vehicles of the plurality of construction vehicle makers.

When the at least one part of the roller assembly includes the collar, each of the configurations and dimensions in the radial direction and in the axial direction of the roller assembly of the portion where the shaft is inserted and the portion where the floating seal is inserted, the material, and the mechanical property of the collar is unified over the same size of construction vehicles having different structural specifications of the plurality of construction vehicle makers. The position, the diameter and the pitch of the coupling hole of the collar for use in coupling the collar to a track frame are allowed to be varied according to the construction vehicles of the plurality of construction vehicle makers.

More particularly, with respect to the shell, each of the inside diameter and the outside diameter, the configuration and the dimension in the axial direction of the shell, the kind of steel and the heat treatment specification of the shell is unified over the same size of construction vehicles of the plurality of construction vehicle makers.

With respect to the shaft, each of the diameter, the kind of steel and the heat treatment specification of the shaft is unified over the same size of construction vehicles of the plurality of construction vehicle makers. Only the length of the shaft is varied according to the construction vehicles of the plurality of construction vehicle makers.

With respect to the floating seal, each of the configurations and dimensions in the radial direction and in the axial direction of the roller assembly, the material and the mechanical property of the floating seal is unified over the same size of the construction vehicles of the plurality of construction vehicle makers.

With respect to the bushing, each of the configurations and dimensions in the radial direction and in the axial direction of the roller assembly, the material and the mechanical property of the bushing is unified over the same size of the construction vehicles of the plurality of construction vehicle makers.

With respect to the collar, each of the configurations and dimensions in the radial direction and in the axial direction of the roller assembly of the portion where the shaft is inserted and the portion where the floating seal is inserted, the material, and the mechanical property of the collar is unified over the same size of construction vehicles of the plurality of construction vehicle makers. The position, the diameter and the pitch of the coupling hole of the collar for use in coupling the collar to a track frame are allowed to be varied according to the construction vehicles of the plurality of construction vehicle makers.

According to the above standardizing structure, with respect to the shell, since each of the kind of steel and the size, the configurations and the dimensions of the forged or cast material, and the finish configurations and dimensions after machining can be unified over the same size of construction vehicles having different structural specifications of the plurality of construction vehicle makers, the material cost, the forging or cast cost, and the machining cost can be decreased.

With respect to the shaft, since the kind of steel of the rolled material and the diameter of the rolled material can be unified over the same size of construction vehicles having different structural specifications of the plurality of construction vehicle makers, the material cost of the shaft can be reduced.

With respect to the floating seal, since the configurations and the dimensions, the material and the mechanical property can be unified over the same size of construction vehicles of the plurality of construction vehicle makers, the productivity increases, accompanied by a decrease in cost.

With respect to the bushing, since the configurations and the dimensions, and the material and the mechanical property can be unified over the same size of construction vehicles having different structural specifications of the plurality of construction vehicle makers, the productivity increases, accompanied by a decrease in cost.

With respect to the collar, since the configurations and the dimensions of one portion of the collar, the material and the mechanical property can be unified over the same size of construction vehicles having different structural specifications of the plurality of construction vehicle makers, the productivity increases, accompanied by a decrease in cost.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
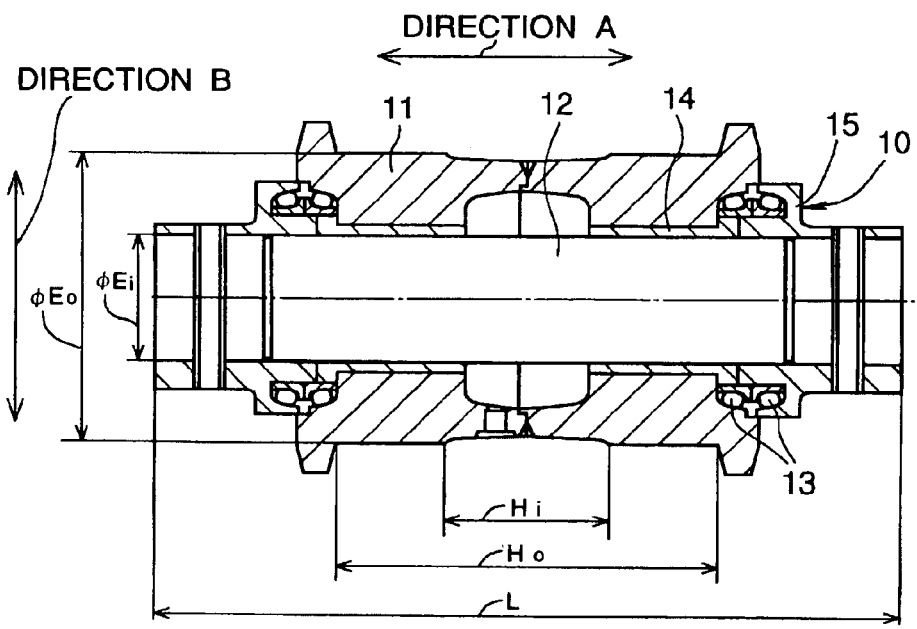
FIG. 1 is a cross-sectional view of a roller assembly to which a structure for standardizing parts of a roller assembly for a construction vehicle according to the present invention is embodied.
Figure 2:
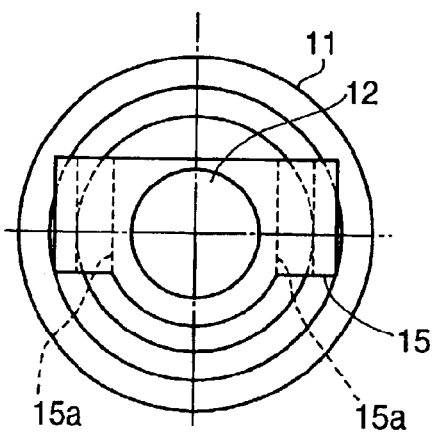
FIG. 2 is a side view of the roller assembly of FIG. 1.

A structure for standardizing parts of a roller assembly for a construction vehicle according to the present invention will be explained with reference to FIGS. 1–4.

Structural specifications for each part of a roller assembly 10 used for the same size of construction vehicles are different among the construction vehicles of a plurality of construction vehicle makers. The parts of the roller assembly 10 includes a shell 11, a shaft 12, a floating seal 13, a bushing 14 and a collar 15.

The roller assembly 10 rolls on an endless track 20. The endless track 20 includes a pair of links 21, and a pin 22 and a bushing 23 for connecting adjacent pairs of links 21 as parts.

In the standardizing structure according to the present invention, in order that the parts of the roller assembly 10 can be commonly used for the same size of construction vehicles having different structural specifications of the plurality of construction vehicle makers, except for a dimension of the shaft 12 in an axial direction (direction A in FIG. 1) of the roller assembly 10, each of configurations and dimensions in a radial direction (direction B in FIG. 1) and in the axial direction of the roller assembly 10, the kind of steel or a material, and a heat-treatment specification or a mechanical property of the shell 11, the shaft 12, the floating seal 13 and the bushing 14 is unified over the same size of construction vehicles of the plurality of construction vehicle makers. The dimension of the shaft 12 in the axial direction of the roller assembly 10 is varied according to the construction vehicles of the plurality of construction vehicle makers. Each of the configurations and dimensions in the radial direction and in the axial direction of the roller assembly 10 of a portion of the collar 15 where the shaft 12 is inserted and a portion of the collar 15 where the floating seal 13 is inserted, the material, and the mechanical property of the collar 15 is unified over the same size of construction vehicles of the plurality of construction vehicle makers. A position, a diameter and a pitch of a coupling hole of the collar 15 for use in coupling the collar 15 to a track frame are allowed to be varied according to the construction vehicles of the plurality of construction vehicle makers.

A more detailed explanation will be made on each of the parts below.

Regarding the shell 11, each of an inside diameter ($\Phi E_i$) and an outside diameter ($\Phi E_o$), a configuration and a diameter in an axial direction of the shell 11, and a kind of steel and a heat treatment specification is unified over the same size of construction vehicles having different structural specifications of the plurality of construction vehicle makers.

For example, in the middle size (20 ton class) of construction vehicles, an inner span ($H_i$) and an outer span ($H_o$) of a pair of portions of the shell where the shell 11 contacts the roller contact surface of the link 21 of the endless track 20 are as follows:

| MAKER | $H_i$(mm) | $H_o$(mm) |
| --- | --- | --- |
| X | 82.77 | 166.26 |
| Y | 89.00 | 169.00 |
| Z | 89.00 | 170.16 |

With the above example, in order that the shell 11 can be commonly used for the same size of construction vehicles having different structural specifications of the plurality of construction vehicle makers, the configuration and the dimension of the shell 11 are determined such that the inner span ($H_i$) of the contact portions of the shell 11 where the shell 11 contacts the link 21 of the endless track 20 is equal to or smaller than the minimum value among the above-listed inner span values and the outer span ($H_o$) of the contact portions of the shell is equal to or greater than the maximum value among the above-listed outer span values. Other structural specifications including the steel kind and the heat treatment specification also are unified over the same size of construction vehicles having different structural specifications of the plurality of construction vehicle makers.

Figure 3:
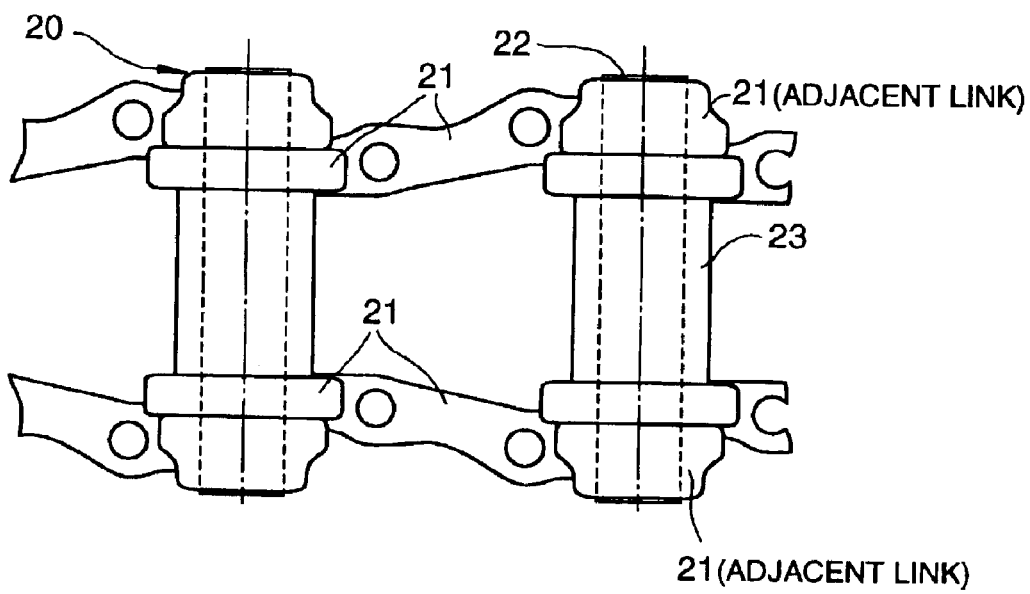
FIG. 3 is a plan view of a portion of an endless track which the roller assembly of FIG. 1 contacts.
Figure 4:
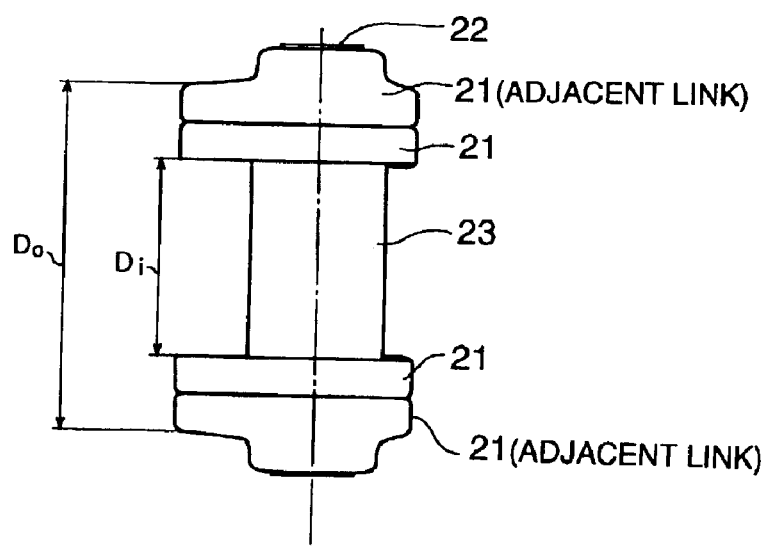
FIG. 4 is a bottom view of the portion of the endless track of FIG. 3.
Figure 5:
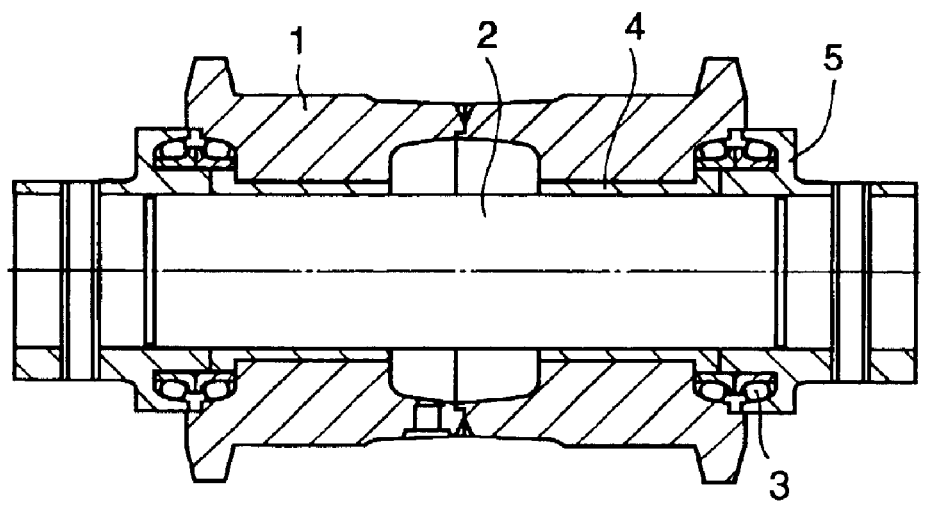
FIG. 5 is a cross-sectional view of a conventional roller assembly for a construction vehicle.
Figure 6:
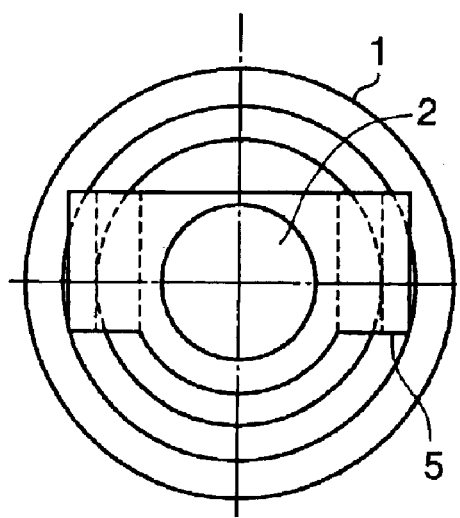
FIG. 6 is a side view of the conventional roller assembly of FIG. 5.

As illustrated in FIGS. 3 and 4, the endless track 20 is constructed by connecting adjacent pairs of links 21 by a pin 22 and a bushing 23, and an inner span ($D_i$) and an outer span ($D_o$) of the endless track 20 correspond to the inner span ($H_i$) and the outer span ($H_o$) of the shell 11, respectively.

Regarding the shaft 12, so long as the strength of the shaft is maintained, since the diameter ($\Phi E_i$) of the shaft 12 can be unified over the same size of construction vehicles having different structural specifications of the plurality of construction vehicle makers, the unification of the diameter of the shaft 12 is made. However, since coupling positions (coupling hole positions) of the roller assemblies 10 to the track frames of the construction vehicles differ from each other among the plurality of construction vehicle makers, a length L of the shaft 12 is varied according to the construction vehicles of the plurality of construction vehicle makers. Other structural specifications including the kind of steel and the heat treatment specification also are unified over the same size of construction vehicles having different structural specifications of the plurality of construction vehicle makers.

Regarding the floating seal 13, when the configuration and the dimension of the shell 11 and the diameter of the shaft 12 are unified as described above, the configurations and dimensions of the floating seal 13 in the radial direction and in the axial direction of the roller assembly 10 can be unified over the same size of construction vehicles of the plurality of construction vehicle makers. Therefore, the unification of the size of the floating seal 13 is made. Other structural specifications including the material and the mechanical property are unified over the same size of construction vehicles having different structural specifications of the plurality of construction vehicle makers.

Regarding the bushing 14, when the configuration and the dimension of the shell 11 and the diameter of the shaft 12 are unified as described above, the configurations and dimensions of the bushing 14 in the radial direction and in the axial direction of the roller assembly 10 can be unified over the same size of construction vehicles of the plurality of construction vehicle makers. Therefore, the unification of the size of the bushing 14 is made. Other structural specifications including the material and the mechanical property also are unified.

Regarding the collar 15, when the diameter of the shaft 12 and the configurations and the dimensions of the floating seal 13 in the radial direction and in the axial directions of the roller assembly 10 are unified as described above, the configurations and dimensions in the radial direction and in the axial direction of the roller assembly 10 of a first portion of the collar 15 where the shaft 12 is inserted and a second portion of the collar 15 where the floating seal 13 is inserted can be unified over the same size of construction vehicles having different structural specifications of the plurality of construction vehicle makers. Therefore, the unification of the size of the collar 15 is made. Other structural specifications including the material and the mechanical property also are unified. However, since a position, a diameter and a pitch of a coupling hole 15a of the collar 15 for coupling the roller assembly 10 to the track frame differ from each other among the construction vehicles having different structural specifications of the plurality of construction vehicle makers, the position, the diameter and the pitch of the coupling hole 15a are allowed to be varied according to the construction vehicles of the plurality of construction vehicle makers.

Though the above unification is for one size (a middle size) of construction vehicle, the same or similar unification is conducted for other sizes (a super-large size, a large size, a small size, a super-small size) of construction vehicles. Of course, the unified shapes and dimensions are variant among the super-large size, a large size, a middle size, a small size, a super-small size of construction vehicles. Further, the kind of steel or the material, and the heat treatment specification or the mechanical property may be or may not be unified among the different sizes of the construction vehicles.

Structural parameters that should be unified or do not need to be unified are summarized in the following table.

TABLE

| Parts | Parameters unified | Parameters non-unified |
|---|---|---|
| Shell | ① inside diameter | |
| | ② outside diameter | |
| | ③ configuration in a radial direction | |
| | ④ dimension in a radial direction | |
| | ⑤ configuration in an axial direction | |
| | ⑥ dimension in an axial direction | |
| | ⑦ kind of steel | |
| | ⑧ heat treatment specification | |
| Shaft | ① diameter of shaft | ① length of shaft |
| | ② kind of steel | |
| | ③ heat treatment specification | |
| Floating Seal | ① configuration in a radial direction | |
| | ② dimension in a radial direction | |
| | ③ configuration in an axial direction | |
| | ④ dimension in an axial direction | |
| | ⑤ material | |
| | ⑥ mechanical property | |
| Bushing | ① configuration in a radial direction | |
| | ② dimension in a radial direction | |
| | ③ configuration in an axial direction | |
| | ④ dimension in an axial direction | |
| | ⑤ material | |
| | ⑥ mechanical property | |
| Collar | ① diameter of a hole receiving the shaft | ① position of a hole for coupling a roller to a track frame |
| | ② radial configuration of portion of the collar receiving a floating seal | ② diameter of a hole for coupling a roller to a track frame |

TABLE-continued

| Parts | Parameters unified | Parameters non-unified |
|---|---|---|
| | ③ radial dimension of a portion of the collar receiving a floating seal | ③ pitch of a hole for coupling a roller to a track frame |
| | ④ axial configuration of a portion of the collar receiving a floating seal | |
| | ⑤ axial dimension of a portion of the collar receiving a floating seal | |
| | ⑥ material | |
| | ⑦ mechanical property | |

Effects or technical advantages of the present invention will now be explained.

With respect to the shell 11, since the kind of steel material (rolled material) and the size of the material (round bar), the forging or casting configuration and the dimension during manufacture, and the final configuration and dimension after machining are unified over the same size of construction vehicles having different structural specifications of the plurality of construction vehicle makers, the material cost, the forging or casting cost, and the machining cost of the shell 11 can be reduced. Further, since the heat treatment specification is unified, the heat treatment of shell 11 can be conducted using the same facility.

With respect to the shaft 12, since the kind of steel material (rolled material) and the size of the material (round bar) are unified over the same size of construction vehicles of the plurality of construction vehicle makers, the material cost of the shaft can be reduced. However, the length of the shaft 12 is varied according to the construction vehicles of the plurality of construction vehicle makers. Further, since the heat treatment specification is unified, the heat treatment of the shaft 12 can be conducted using the same facility.

With respect to the floating seal 13, since the configurations and the dimensions in the radial direction and in the axial direction of the roller assembly 10, the material, and the mechanical property are unified over the same size of construction vehicles having different structural specifications of the plurality of construction vehicle makers, the production manner can be changed from the conventional production of a great number of kinds and a small quantity of parts to a production of a small number of kinds and a great quantity of parts, so that productivity increases, accompanied by a decrease in cost.

With respect to the bushing 14, since the configurations and the dimensions in the radial direction and in the axial direction of the roller assembly 10, the material, and the mechanical property are unified over the same size of construction vehicles having different structural specifications of the plurality of construction vehicle makers, the production manner can be changed from the production of a great number of kinds and a small quantity of parts to a production of a small number of kinds and a great quantity of parts, so that productivity increases, accompanied by a decrease in cost.

With respect to the collar 15, since each of the configurations and the dimensions in the radial direction and in the axial direction of the roller assembly 10 of the first portion of the collar 15 where the shaft 12 is inserted and the second portion of the collar where the floating seal 13 is inserted, the material of the collar 15, and the mechanical property of the collar 15 is unified over the same size of the construction vehicles having different structural specifications of the plurality of construction vehicle makers, the production manner can be changed from the production of a great number of kinds and a small quantity of parts to a production of a small number of kinds and a great quantity of parts, so that productivity increases, accompanied by a decrease in cost.

In the foregoing description, although effect or technical advantages with the unification are discussed for a middle size of construction vehicle, the same or similar effect or technical advantages are obtained for other sizes (a super-large size, a large size, a small size, a super-small size) of construction vehicles.

The foregoing description of the embodiments of the present invention provides illustration and description, but is not intended to be exhaustive or to limit the invention to the precise form disclosed. Modifications and variations are possible that are consistent with the above teachings or may be acquired from practice of the invention. For example, the various features of the invention, which are described in the context of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. A structure for standardizing at least one part of a roller assembly for a construction vehicle so that said part can be used for a same size of construction vehicles having different structural specifications of a plurality of construction vehicle makers, (a) wherein said at least one part of the roller assembly includes at least one of a shell, a shaft, a floating seal and a bushing, each of configurations and dimensions in a radial direction and in an axial direction of said roller assembly, a kind of steel or material, and a heat treatment specification or a mechanical property of said at least one of said shell, said shaft, said floating seal and said bushing is unified over said same size of construction vehicles of said plurality of construction vehicle makers, while a dimension of said shaft in the axial direction of said roller assembly is varied according to said construction vehicles of said plurality of construction vehicle makers, and (b) wherein said at least one part of the roller assembly includes a collar, each of configurations and dimensions in the radial direction and in the axial direction of said roller assembly of a portion where said shaft is inserted and a portion where said floating seal is inserted, material, and a mechanical property of said collar is unified over said same size of construction vehicles of said plurality of construction vehicle makers, while a position, a diameter and a pitch of a coupling hole of said collar for use in coupling said collar to a track frame are allowed to be varied according to said construction vehicles of said plurality of construction vehicle makers.

2. A structure for standardizing at least one part of a roller assembly for a construction vehicle so that said part can be used for a same size of construction vehicles having different structural specifications of a plurality of construction vehicle makers, said at least one part including at least one of a shell, a shaft, a floating seal and a bushing, wherein each of configurations and dimensions in a radial direction and in an axial direction of said roller assembly, a kind of steel or material, and a heat treatment specification or a mechanical property of said at least one of said shell, said shaft, said floating seal and said bushing is unified over said same size of construction vehicles of said plurality of construction vehicle makers, while a dimension of said shaft in the axial direction of said roller assembly is varied according to said construction vehicles of said plurality of construction vehicle makers.

3. A structure for standardizing at least one part of a roller assembly for a construction vehicle so that said part can be used for a same size of construction vehicles having different structural specifications of a plurality of construction vehicle makers, said at least one part including a collar, wherein each of configurations and dimensions in the radial direction and in the axial direction of said roller assembly of a portion where said shaft is inserted and a portion where said floating seal is inserted, material, and a mechanical property of said collar is unified over said same size of construction vehicles of said plurality of construction vehicle makers, while a position, a diameter and a pitch of a coupling hole of said collar for use in coupling said collar to a track frame are allowed to be varied according to said construction vehicles of said plurality of construction vehicle makers.

4. A structure according to claim 1, wherein with respect to said shell, each of an inside diameter and an outside diameter, a configuration and a dimension in an axial direction of said shell, the kind of steel and the heat treatment specification of said shell is unified over said same size of construction vehicles of said plurality of construction vehicle makers.

5. A structure according to claim 1, wherein with respect to said shaft, each of a diameter, the kind of steel and the heat treatment specification, of said shaft is unified over said same size of construction vehicles of said plurality of construction vehicle makers, and only a length of said shaft is varied according to said construction vehicles of said plurality of construction vehicle makers.

6. A structure according to claim 1, wherein with respect to said floating seal, each of the configurations and dimensions in the radial direction and in the axial direction of said roller assembly, the material and the mechanical property of said floating seal is unified over said same size of said construction vehicles of said plurality of construction vehicle makers.

7. A structure according to claim 1, wherein with respect to said bushing, each of the configurations and dimensions in the radial direction and in the axial direction of said roller assembly, the material and the mechanical property of said bushing is unified over the same size of said construction vehicles of said plurality of construction vehicle makers.

8. A structure according to claim 2, wherein with respect to each shell, each of an inside diameter and an outside diameter, a configuration and a dimension in an axial direction of said shell, the kind of steel and the heat treatment specification of said shell is unified over said same size of construction vehicles of said plurality of construction vehicle makers.

9. A structure according to claim 2, wherein with respect to said shaft, each of a diameter, the kind of steel and the heat treatment specification of said shaft is unified over said same size of construction vehicles of said plurality of construction vehicle makers, and only a length of said shaft is varied according to said construction vehicles of said plurality of construction vehicle makers.

10. A structure according to claim 2, wherein with respect to said floating seal, each of the configurations and dimensions in the radial direction and in the axial direction of said roller assembly, the material and the mechanical property of said floating seal is unified over said same size of said construction vehicles of said plurality of construction vehicle makers.

11. A structure according to claim 2, wherein with respect to said bushing, each of the configurations and dimensions in the radial direction and in the axial direction of said roller assembly, the material and the mechanical property of said bushing is unified over the same size of said construction vehicles of said plurality of construction vehicle makers.

* * * * *